United States Patent [19]

Borm

[11] 4,126,380
[45] Nov. 21, 1978

[54] PROBE WITH CONTACT INDICATING MEANS

[75] Inventor: David S. Borm, Red Hook, N.Y.

[73] Assignee: International Business Machines Corporation, Armonk, N.Y.

[21] Appl. No.: 811,759

[22] Filed: Jun. 30, 1977

[51] Int. Cl.$^2$ ............................................. G05D 25/00
[52] U.S. Cl. ................................. 350/266; 324/158 P
[58] Field of Search ............... 350/266; 324/72.5, 149, 324/157, 158 F, 158 P; 339/108 TP

[56] References Cited

U.S. PATENT DOCUMENTS 3,498,692  3/1970  Jewitt et al. ..................... 350/266 X

OTHER PUBLICATIONS

Beauregard et al., *IBM Technical Disclosure Bulletin* vol. 8, No. 8, Jan. 1966, p. 1144.
Laczko et al., *IBM Technical Disclosure Bulletin* vol. 12, No. 6, Nov. 1969, p. 868.
Barr et al., *IBM Technical Disclosure Bulletin* vol. 16, No. 5, Oct. 1973, pp. 1533 and 1534.

*Primary Examiner*—F. L. Evans
*Attorney, Agent, or Firm*—Edward S. Gershuny

[57] ABSTRACT

A probe including means for indicating when the probe has come into physical contact with a target. The probe has a deformable opaque tip containing a transparent window which is normally covered by a shutter. When the probe contacts a target the probe tip deforms, moving the window away from the shutter. Light will be reflected from the target through the window to indicate that contact has been made.

6 Claims, 5 Drawing Figures

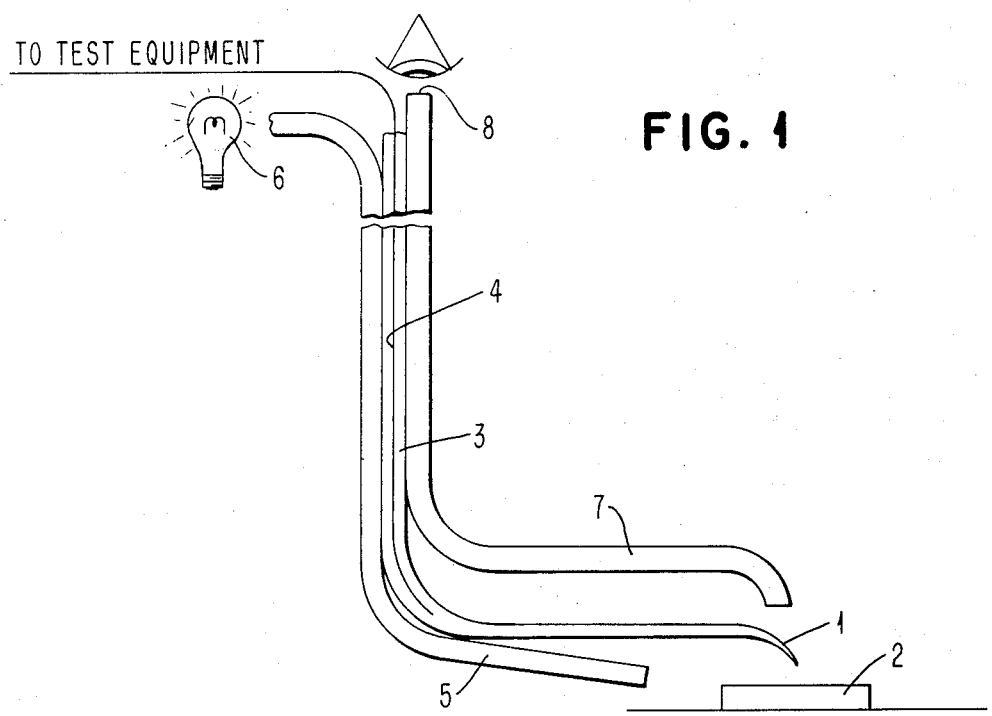
FIG. 1
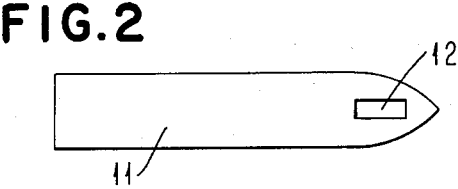
FIG. 2
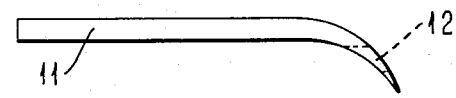
FIG. 3
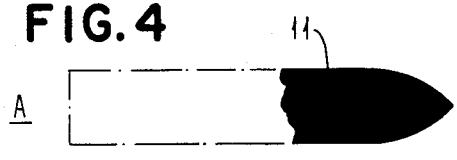
FIG. 4
A
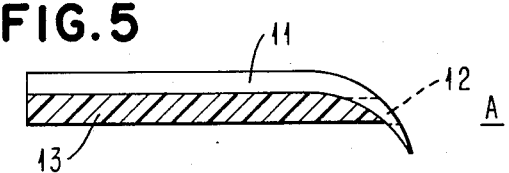
FIG. 5
A
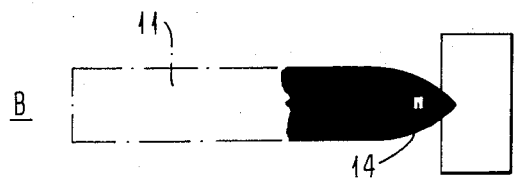
B
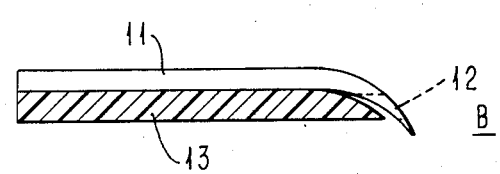
B
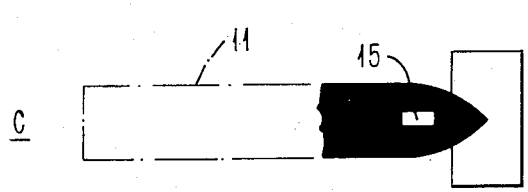
C
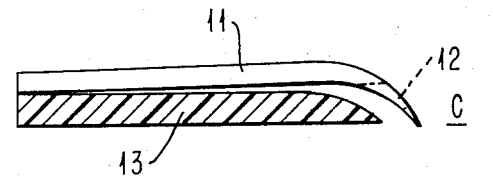
C

PROBE WITH CONTACT INDICATING MEANS

INTRODUCTION

The invention relates to improvements in probes. More particularly, it relates to probes which include a mechanism for indicating when the probe has come into contact with a target.

There are a variety of situations in which a probe (such as, for example, an electrical test probe) must be moved, under remote control, into contact with a target (such as a pad on a semiconductor chip). In such applications, it is necessary to know that the probe is in contact with the target. It is also desirable that a contact indication be generated with minimal contact force. Typical prior art devices for indicating contact are primarily a variety of proximity detectors which rely on inductance measurements, and contact detectors in which contact causes closing of an electric switch to turn on a visual or aural signal. Many of these indicators are complex and expensive. Proximity detectors may also be somewhat inaccurate in that it is difficult for an operator to distinguish among the three conditions (1) probe very near to, but not quite touching, the target; (2) probe barely touching the target, but not firmly enough for good electrical contact; and (3) firm physical and electrical contact between probe and target. On the other hand, the indicators which depend upon closing an electrical switch provide no indication of the degree of contact force between the probe and target.

This invention provides a probe with contact indicating mechanisms. In accordance with a preferred embodiment of the invention, the probe is carried on the end of a rod that can be remotely maneuvered vertically and horizontally to contact a target. The rod also carries two bundles of glass fibers. One of the fiber bundles is utilized to direct light onto the target from an external source. The other fiber bundle is preferably placed above the probe tip and is used to view the probe and the target. The probe tip is opaque but contains a transparent window. A shutter block below the window covers it to prevent passage of light therethrough when the probe is not in contact with the target. When the probe comes into physical contact with the target, the probe tip will be deformed by the contact force, and the motion of the transparent window away from the shutter block will allow light reflected from the target to pass through the window to the second fiber optic bundle to provide a visual indication of the contact. In accordance with one embodiment of the invention, the amount of force between the probe and target will control the amount of deformation of the probe tip which, in turn, will control the pattern of light visible through the transparent window, thus providing a visual indication of the amount of force between probe and target.

This invention provides most of the advantages of the various kinds of prior art contact indicators. It provides a positive, clear indication when physical contact is made, and also provides an indication of the amount of force between probe and target.

This invention provides a constant indication of contact as long as contact between probe and target is maintained. This is important because it enables an operator to ascertain at a glance, without moving the probe, whether or not there is contact.

Another advantage of this contact indicator is that it is directly in the normal sight path of an operator. It does not interfere with his vision of the probe and target nor does it distract his attention from the probe or target.

Implementation of the invention is quite simple and inexpensive, and may be realized quite easily with simple modifications to many existing probe systems.

The above and other objects, features and advantages of the invention will be apparent from the following detailed descriptions of preferred embodiments thereof as illustrated in the accompanying drawings.

BRIEF DESCRIPTION OF THE DRAWINGS

FIG. 1 illustrates certain aspects of a probe system which may advantageously use this invention.

FIG. 2 is a top view of a probe tip used as part of this invention.

FIG. 3 is a side view of the probe tip.

FIG. 4, in views 4A through 4C, presents top views of the probe when it is (a) not in contact with the target, (b) barely in contact with the target and (c) in more forceful contact with the target.

FIG. 5, in views 5A through 5C, presents side views of the probe in the same three positions illustrated in FIG. 2.

DETAILED DESCRIPTION

FIG. 1 illustrates a system wherein an electrical probe tip 1 is to be brought into contact with test pads (not shown) on an electronic circuit module 2. The probe 1 may be carried at the end of a rod 3 through which runs a wire 4 from the probe tip to some electrical test equipment (not shown). Associated with rod 3 is a first bundle of fiber optic strands 5 which conduct light from a source 6 to a module 2 in order to illuminate the target. A second bundle 7 of fiber optic strands has one end connected to a viewing lens 8, and the other end oriented above the tip of probe 1 so that an operator may see the probe tip and the target. This bundle could be surrounded by additional fiber optics (not shown) which also conduct light to the target. The system will also contain mechanisms (not shown) for providing relative motion, vertically and horizontally, between the probe tip 1 and the target. In operation of the system, the probe tip will initially be above the target, and not in contact therewith. The probe tip and/or the target will then be moved horizontally with respect to the other in order to position the probe above a particular target point on the module. The relative horizontal positioning between probe tip and module will be viewed through lens 8 and fiber optic bundle 7. When the probe tip is above the target, the tip will be moved verticaly towards the target (and/or the target moved vertically towards the probe tip) until contact is made so that an electrical measurement may be taken.

Referring to FIGS. 2 through 5, details of a preferred embodiment of the probe tip used for this invention may be seen. The probe tip comprises a deformable member 11 which provides the electrical contact to a target. Electrical contact member 11 is made of an opaque material and has within it a transparent window, or cutout portion, 12. Fixed to the probe or to the member which supports the probe (such as rod 3 shown in FIG. 1) is a shutter block 13 which is made of an opaque (and preferably electrically insulating) material and which covers the transparent window 12 to prevent passage of light therethrough when the probe tip is not in forceful contact with a target. Top and side views of the probe when it is not in contact with a target are shown in FIGS. 4A and 5A, respectively.

The probe tip shown in FIGS. 2 through 5 is so configured that, when it contacts a target, its deformation will be such that the portion containing the window 12 will move horizontally (to the right in the drawings). As shown in FIGS. 4B and 5B, when the probe tip is lightly touching a target, this deformation will move a portion 14 of transparent window 12 horizontally past the shutter block 13 to permit light (from the external source 6 conducted through fiber optics 5, FIG. 1) to be reflected from the target through the portion 4 of window 12. To an operator who is observing the probe tip and target utilizing a system such as that shown in FIG. 1, the result of this contact will have the appearance of a light suddenly being turned on in the center of the probe tip. (Until this light suddenly appeared, the observer would have seen the probe tip as a solid dark shadow above the lighted target.) The small size of this light presents a visual indication that the contact force is still quite small.

As the probe is lowered still farther to more forcefully contact the target, the deformation of electrical conductor 11 moves the transparent window 12 farther away from shutter 13, as shown in FIGS. 4C and 5C, to show a larger rectangle 15 of light indicating greater lateral displacement of the end of the probe tip caused by greater contact force between probe tip and target. Thus, the size of the lighted window presents a visual indication of the amount of contact force between probe and target. When using this embodiment of the invention, it will be best if the upper surface of shutter block 13 and the lower surface of electrical conductor 11 are both painted, or otherwise treated, to be relatively non-reflective, so that substantially the only light which will be perceived through opening 12 will be that which is directly reflected from the target.

If this invention were to be used in a system in which it is desired that a minimum of contact force be utilized, it might be desirable to paint, or otherwise treat, the upper surface of shutter block 13 and the lower surface of conductor 11 so that they are reflective to light. If this is done, when a small amount of force deforms the conductive portion 11 of the probe, moving it away from intimate contact with shutter block 13, a larger amount of light that is reflected from the target will, because of the reflective surfaces of shutter block 13 and conductive portion 11, be reflected through transparent window 12 to provide enhanced brightness viewed through fiber optic bundle 7 and lens 8 (see FIG. 1). Of course, this alternative embodiment of the invention will be less able to discriminate between varying amounts of force between probe and target, but it will provide a stronger indication when only light contact has occurred.

Those skilled in the art will also recognize that mechanisms other than the precise one shown could be used for covering and uncovering the transparent window in the probe tip. The essential point, for this invention is that there be a shutter, or equivalent thereof, which prevents light from passing through a transparent portion of the probe when the probe is not in contact with the target, and which, as a result of the mechanical contact between probe and target, uncovers the transparent window in the opaque probe to permit passage of light therethrough.

Those skilled in the art will also recognize that the arrangements for lighting and viewing need not be precisely as is shown in FIG. 1. The essential elements are a source of light for illuminating the target and a source for providing the visual indication by shining through the transparent window (these could comprise a single source, using reflection from the target to furnish light through the window, or light could be separately directed towards the window) and a means for detecting light shining through the transparent portion of the probe tip. This latter means could be a human eye or it could be a light responsive mechanism which automatically stops vertical motion of the probe when contact is made.

The preferred embodiment described above utilizes a probe having a geometry such that vertical deformation, caused by contact between probe and target, is accompanied by a similar amount of horizontal deformation. However, this invention could also be utilized with a probe which has little or no significant horizontal deformation. If the only substantial probe deformation is vertical, and if a shutter block such as the one described herein is used, then it might be desirable to direct a light towards the probe tip at an appropriate angle to make certain it will be visible through the window. Also, if this invention is used in an application wherein the target surface is not sufficiently reflective, a separately directed light might be necessary.

While the invention has been particularly shown and described with reference to preferred embodiments thereof, those skilled in the art will recognize that the above and other changes in form and details may be made therein without departing from the spirit and scope of the invention.

What is claimed is:

1. Means for indicating that a probe has come into physical contact with a target, comprising:
   a source of light;
   a deformable opaque probe tip containing a transparent window;
   shutter means normally covering said window when said probe tip is not in contact with said target;
   said probe tip being so constructed that contact between said probe tip and said target will cause said transparent window to be uncovered permitting light from said source to pass through said transparent window to provide an indication of contact between said probe tip and said target.

2. The indicating means of claim 1 including:
   means to vary the amount of light passing through said window in accordance with the amount of contact force between said probe tip and said target.

3. The indicating means of claim 1 including:
   means directing the light from said source of light upon said target, said indication of contact comprising light reflected from said target.

4. A probe system capable of motion relative to a target, comprising:
   a source of illumination;
   a probe movable with respect to said target;
   means for viewing said probe and said target;
   said probe comprising a deformable opaque probe tip containing a transparent window, and shutter means covering said window to prevent passage of light therethrough when the probe tip is not in forceful contact with said target;
   said probe tip, upon contact with said target, being so constructed as to provide relative motion between said transparent window and said shutter means to permit light from said source of illumination to pass through said transparent window to provide an indication of said contact.

5. The probe system of claim 4 including:
means to vary the amount of light passing through said window in accordance with the amount of contact force between said probe tip and said target.

6. The probe system of claim 4 including:
means directing light from said source of illumination upon said target, said indication of said contact comprising light reflected from said target.